(12) United States Patent
Holt

(10) Patent No.: US 9,304,063 B2
(45) Date of Patent: Apr. 5, 2016

(54) PAINT TESTER STATION

(71) Applicant: G. Gary Holt, Morristown, TN (US)

(72) Inventor: G. Gary Holt, Morristown, TN (US)

( * ) Notice: Subject to any disclaimer, the term of this patent is extended or adjusted under 35 U.S.C. 154(b) by 431 days.

(21) Appl. No.: 13/761,627

(22) Filed: Feb. 7, 2013

(65) Prior Publication Data

US 2013/0205924 A1 Aug. 15, 2013

Related U.S. Application Data

(60) Provisional application No. 61/597,394, filed on Feb. 10, 2012.

(51) Int. Cl.
*G01M 99/00* (2011.01)

(52) U.S. Cl.
CPC ............ *G01M 99/00* (2013.01); *G01M 99/008* (2013.01)

(58) Field of Classification Search
CPC ............ B44D 3/18; B44D 2/002; A45C 9/00; B43L 3/005; B43L 3/025
USPC ............ 73/150 R, 865.9, 159, 865.6, 866.3, 73/432.1; 248/441.1–465.1; 242/422.4, 242/538.3; 206/575, 1.7
See application file for complete search history.

(56) References Cited

U.S. PATENT DOCUMENTS

| | | | |
|---|---|---|---|
| 6,619,474 B2 * | 9/2003 | Montgomery | 206/1.9 |
| 7,984,808 B1 * | 7/2011 | Lai | 206/575 |
| 2013/0180936 A1 * | 7/2013 | Subbaraman et al. | 211/45 |

FOREIGN PATENT DOCUMENTS

| | | | | |
|---|---|---|---|---|
| DE | 19706178 A1 * | 8/1998 | | |
| GB | 2230177 A * | 10/1990 | | B25H 3/02 |
| WO | WO 0105605 A1 * | 1/2001 | | |

* cited by examiner

*Primary Examiner* — Peter Macchiarolo
*Assistant Examiner* — Anthony W Megna Fuentes
(74) *Attorney, Agent, or Firm* — Pitts & Lake, P.C.

(57) ABSTRACT

A paint tester station for testing a paint applicator is disclosed. The paint tester station comprises a testing material defining a testing surface suitable for testing a paint applicator thereon, and a housing defining a plurality of walls surrounding a periphery of the testing surface. The housing defines a window providing access to the testing surface. Thus, as paint is applied to the testing surface through the window, the walls cooperate to assist in limiting application of paint to within the periphery of the testing surface.

1 Claim, 6 Drawing Sheets

PAINT TESTER STATION

CROSS-REFERENCE TO RELATED APPLICATIONS

This application claims the benefit of U.S. Provisional Application No. 61/597,394, filed on Feb. 10, 2012, which is incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The invention relates to paint testing, and more particularly, to a paint tester station for testing paint applicators, such as for example spray cans and the like.

2. Description of the Related Art

Various applicators for applying paint, stain, dye, or the like (hereinafter collectively referred to as "paint") to a surface are known in the art. Examples of such applicators include, but are not limited to, spray cans, sprayers, brushes, sponges, cloths, rollers, etc. (hereinafter collectively referred to as "applicators"). In the application of paint, it is often desirable to test a paint applicator before using the applicator to apply paint to a desired surface, for example in order to determine whether the applicator is functioning properly, or to obtain an example of how the paint will ultimately appear when applied to the desired surface. Such testing may occur, for example, by using the applicator to apply a small amount of paint to a testing surface, such as for example a piece of scrap material, a piece of paper, the ground, etc.

When applying paint to a testing surface, inaccurate testing of the paint and paint applicator may occur if the selected testing surface differs greatly in color, composition, or texture from the desired surface to be painted. More specifically, if the color, composition, or texture of the selected testing surface differs from the desired surface to be painted, the resulting painted test surface may appear differently than the painted desired surface. For example, in the case of certain types of paints, such as transparent and semi-transparent paints, paint which is applied to an underlying surface may not completely mask the underlying surface, allowing a portion of the color of the underlying surface to show through the applied paint. Thus, if the color of the selected testing surface is, for example, much darker than the desired surface to be painted, the color of the underlying testing surface may show through the paint which is applied to it, thereby producing an example which appears darker than the painted desired surface will appear. If the composition or texture of the selected testing surface differs from the desired surface to be painted, the paint which is applied to the testing surface may appear to drip excessively, or may otherwise exhibit characteristics which differ from paint which is applied to the desired surface.

When applying paint to a testing surface using an applicator, additional problems may occur if the applicator is of the type which allows inaccurate or inadvertent placement of the paint, such as for example overspray, drips, splashes, etc. Such inaccurate or inadvertent paint placement may result in the application of paint to unintended surfaces surrounding the selected testing surface. Furthermore, once paint is applied to a testing surface, disposal of the testing surface on which wet paint is applied is often problematic.

In light of the above, there is a need in the art for a paint tester station which provides a suitable testing surface for testing a paint applicator. There is further need in the art for a paint tester station which assists in limiting inadvertent placement of paint on surfaces proximate the testing surface, and which provides for convenient storage or disposal of used testing surfaces.

BRIEF SUMMARY OF THE INVENTION

According to several features of the present general inventive concept, a paint tester station for testing a paint applicator is disclosed herein. In several embodiments, the paint tester station may comprise a testing material defining a testing surface suitable for testing a paint applicator thereon. The paint tester station may further comprise a housing defining a plurality of walls surrounding a periphery of the testing surface and a window providing access to the testing surface. In several embodiments, as paint is applied to the testing surface through the window, the walls cooperate to assist in limiting application of paint to within the periphery of the testing surface.

The testing material may be defined by a sheet of flexible material, and more specifically, may be fabricated from a material selected from the group consisting of paper, fabric, and polymer. In certain embodiments, the testing material is fabricated from paper.

In several embodiments constructed according to several features of the present general inventive concept, the housing has a central portion defining the window, an upper portion adapted to house and dispense the testing material to the central portion, and a lower housing portion adapted to contain used testing material therein. In some embodiments, the upper housing portion has oppositely disposed first and second side walls and a spindle extending therebetween. The spindle is configured to carry a roll of testing material coiled about an axial dimension of the spindle and to allow rotation of the roll of testing material such that the testing material may be unrolled from the spindle and dispensed outwardly from the upper housing portion. In certain embodiments, the spindle may be defined by an elongated member rotatably secured between the first and second side walls. In certain embodiments, the spindle may be removably secured between the first and second side walls. In certain embodiments, the upper housing portion further has a bottom wall extending between the upper housing portion and the central housing portion, the bottom wall defining a first slot sized and oriented along the upper housing portion to allow testing material to be dispensed from the upper housing portion therethrough.

In certain embodiments, the lower housing portion has an upper wall extending between the lower housing portion and the central housing portion, the upper wall defining a second slot sized and oriented along the lower housing portion to allow used testing material to be received into the lower housing portion therethrough. In certain embodiments, the lower housing portion further has oppositely disposed third and fourth side walls and a reel extending therebetween, the reel being attachable to a leading edge of the roll of testing material and selectively rotatable to draw testing material from the upper housing portion through the central housing portion and into the lower housing portion. In some embodiments, the reel comprises an elongated member rotatably secured between the first and second side walls and at least one handle disposed at an end of the elongated member exterior to the lower housing portion, the handle being grippable by a user to allow the user to selectively rotate the reel within the lower housing portion.

In certain embodiments, the central housing portion has first and second forward edges extending along opposite sides of the window. In some embodiments, the paint tester station further includes a door rotatably secured along each forward edge, each door being rotatable between a closed position in which the window is at least partially obstructed by the door and an open position in which the window is unobstructed by the door. In certain embodiments of the paint tester station, at least one of the walls of the housing defines a third slot for receiving a paint testing strip proximate the testing surface of the testing material. In certain embodiments, the paint tester station further includes a source of paint testing strips disposed along an exterior surface of the housing.

According to several features of the present general inventive concept, a paint tester station for testing a paint applicator may comprise an elongated sheet of flexible testing material having a leading edge and defining a testing surface along a surface thereof. The paint tester station may further comprise a first housing portion configured to carry the testing material and to allow the testing material to be dispensed from a dispensing face of the upper housing portion. The paint tester station may further comprise a second housing portion having an interior configured to receive testing material dispensed from the first housing portion dispensing face, the second housing portion defining a window providing access to dispensed testing material within the second housing portion to allow testing of a paint applicator upon the testing material. The paint tester station may further comprise a third housing portion defining a reel rotatably secured to and extending between opposite first and second side walls of the third housing portion. The reel may be securable to the leading edge of the sheet of paper and selectively rotatable. In these embodiments, rotation of the reel with the leading edge secured thereto may dispense the sheet of paper from the first housing portion and draw the sheet of paper through the second housing portion and into the third housing portion. In certain embodiments, the testing material is rolled about a tubular core, and the first housing portion includes a spindle secured to and extending between opposite first and second side walls of the first housing portion and through the tubular core such that the testing material is rotatable about a central axis of the spindle. In certain embodiments, the spindle is removably secured between the first and second side walls of the first housing portion. In certain embodiments, the first housing portion defines a first slot in the dispensing face sized to receive dispensed testing material therethrough, and the third housing portion defines a second slot sized to receive used testing material therethrough. In certain embodiments, at least one of the first, second, and third housing portions defines a third slot for receiving a paint testing strip proximate the testing surface of the testing material.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
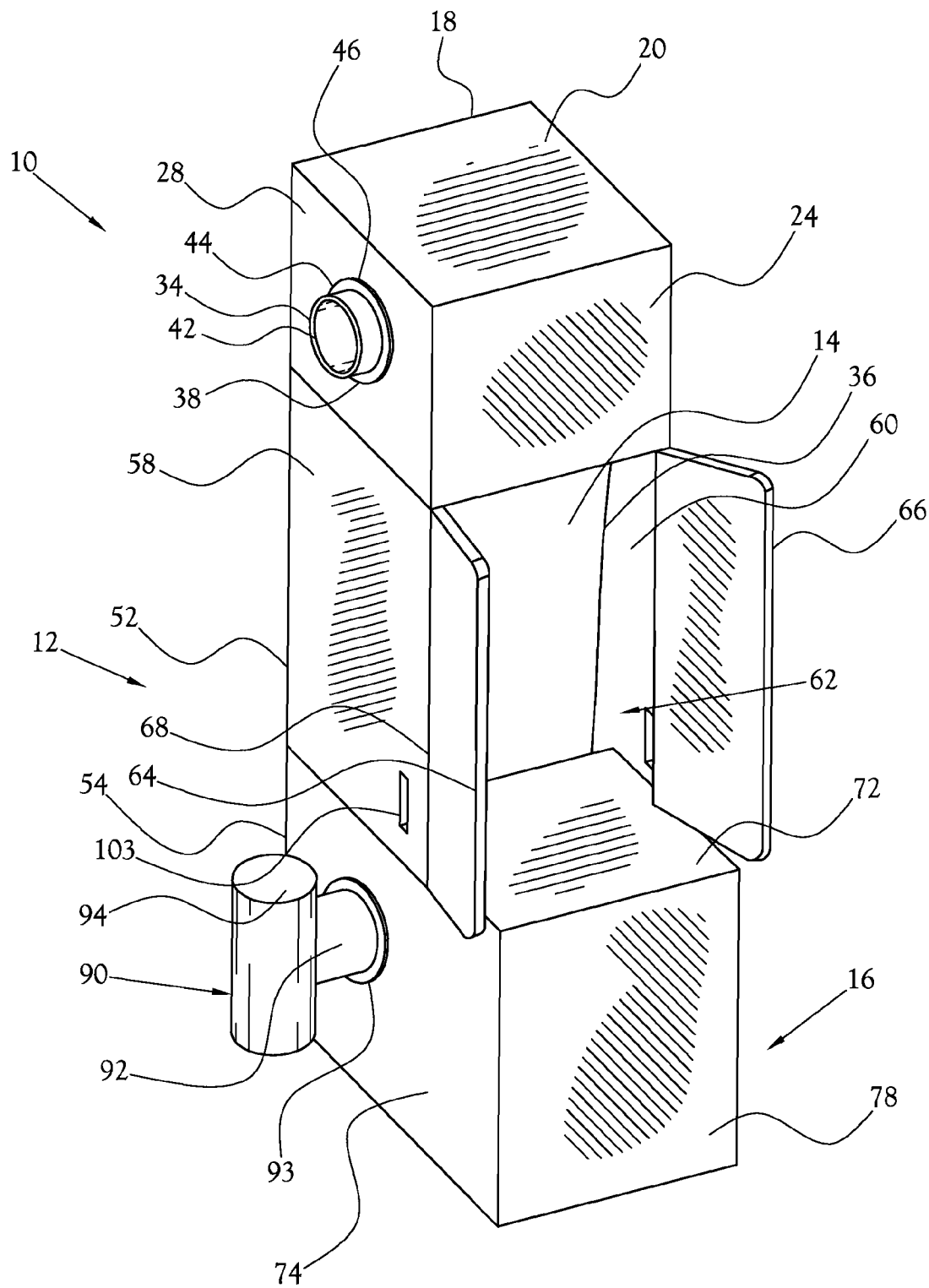
FIG. 1 is a front-perspective view showing one embodiment of a paint tester station according to several features of the present general inventive concept.

In accordance with several features of the present general inventive concept, a paint tester station which provides a testing surface for testing a paint applicator is disclosed herein and in the accompanying figures. With reference to the accompanying figures, the paint tester station 10 includes generally a housing 12 having at least one sheet of dispensable testing material 36 contained therein which defines a testing surface 14. As will be further discussed below, in several embodiments the housing 12 extends about a periphery of the testing material 36 to limit and contain inadvertent placement of paint proximate the testing surface 14. Furthermore, in several embodiments, the housing 12 includes a disposal container 16 for storing used testing material 36 for subsequent disposal.

Figure 2:
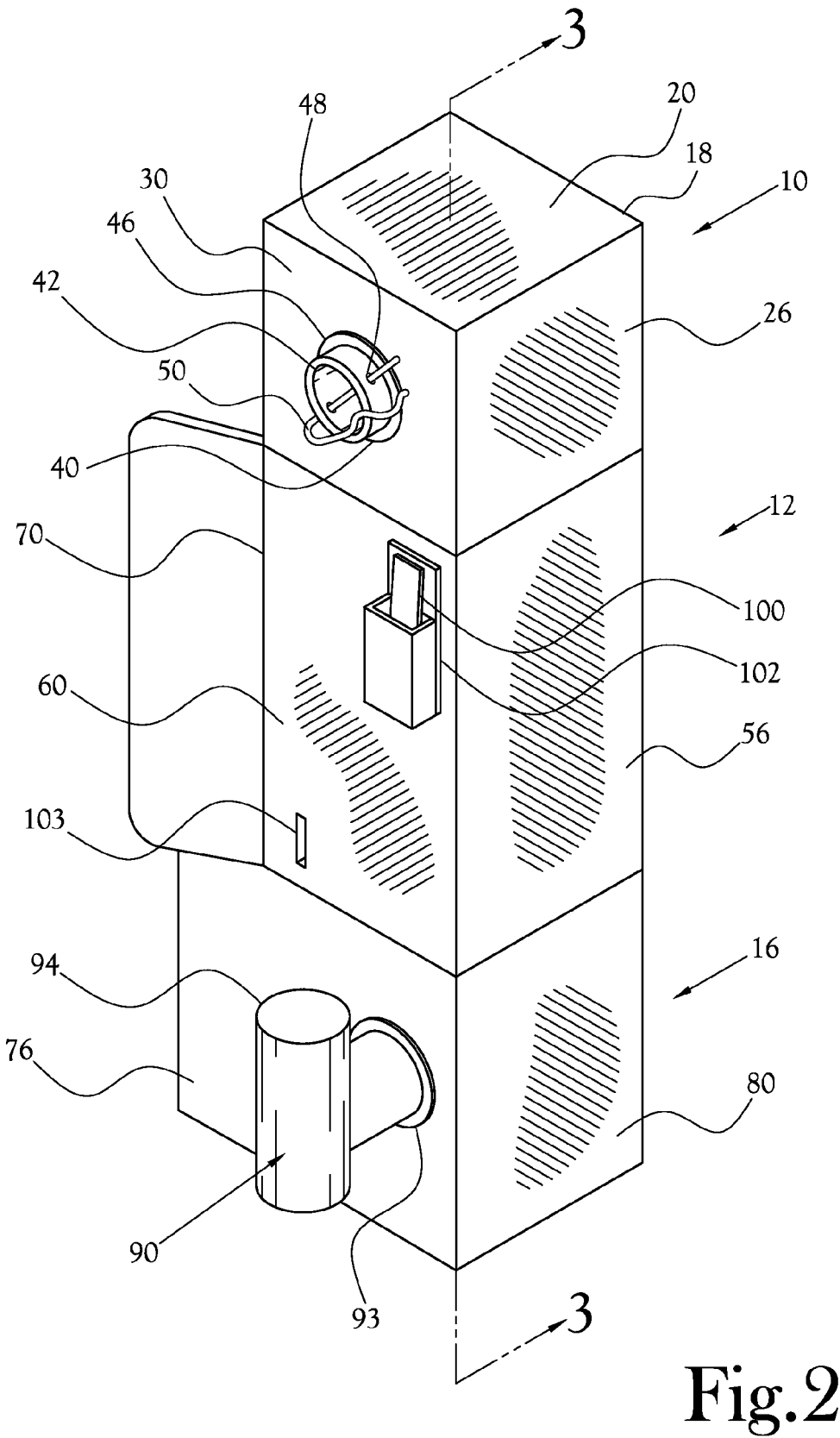
FIG. 2 is a rear-perspective view of the paint tester station of FIG. 1.
Figure 3:
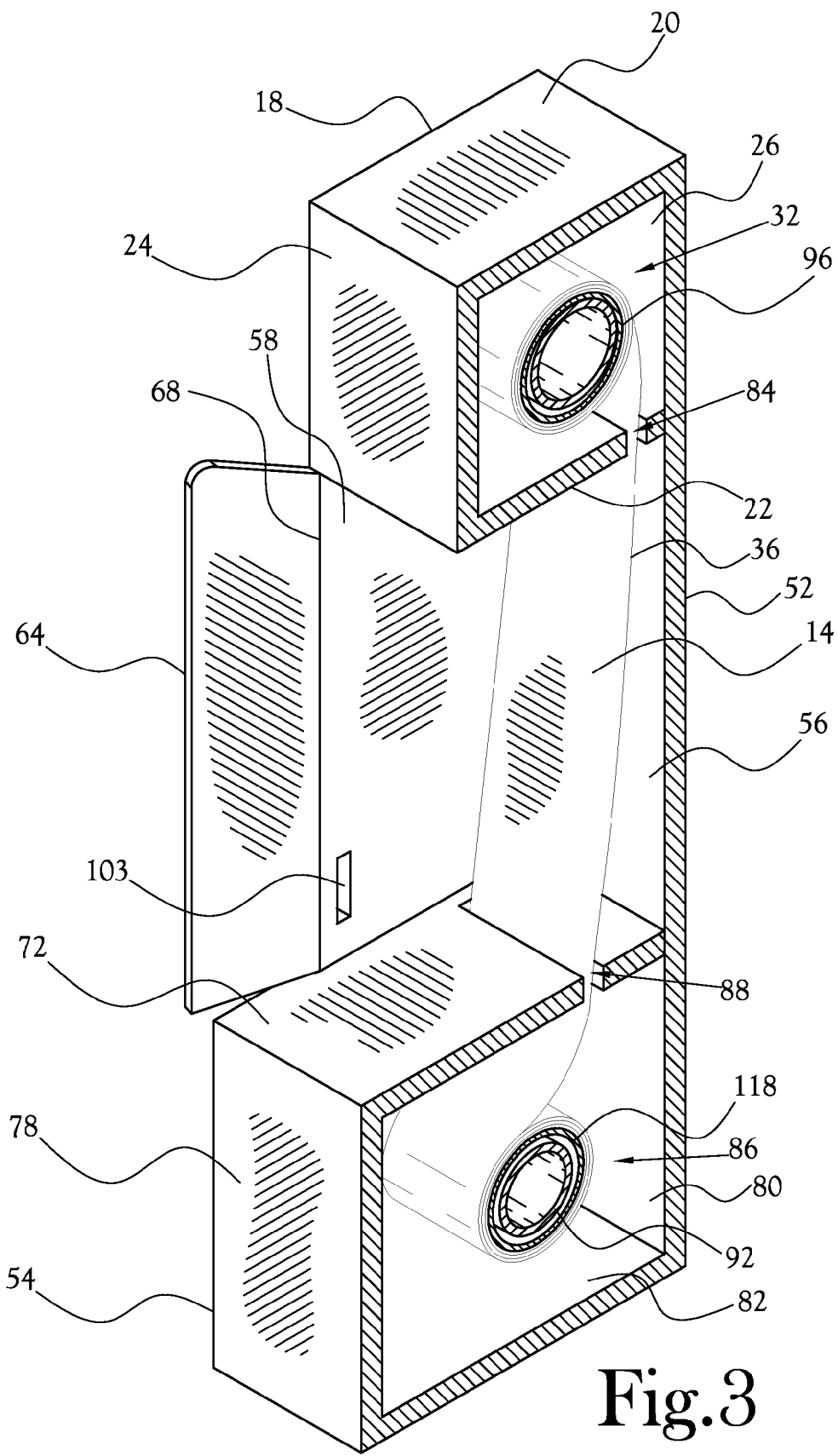
FIG. 3 is a cutaway perspective view showing a cross-section of the paint tester station of FIG. 2 taken along line 3-3.

FIGS. 1-3 illustrate one embodiment of a paint tester station 10 according to several features of the present general inventive concept. In the embodiment of FIGS. 1-3, the paint tester station 10 includes a housing 12 having an upper portion 18 for dispensing testing material 36, a central housing portion 52 which allows for exposure of a testing surface 14 of dispensed testing material 36, and a lower housing portion 54 which is adapted to contain used testing material 36 therein. The testing material 36 is generally defined by a sheet of flexible material, such as for example paper, cloth, plastic, or the like, and defines generally a testing surface 14 along a surface thereof. The testing surface 14 is generally suitable for testing a selected paint using a selected paint applicator. It will be understood that the exact desirable composition of the testing surface 14 may vary, depending upon the specific paint and/or paint applicator to be used. However, it will generally be understood that the testing surface 14 is of a composition such that, upon application of a selected paint thereto, the testing surface 14 provides a suitable indication of an anticipated characteristic of the paint if applied to a desired additional surface to be painted. In several embodiments, the testing material 36 is defined by a sheet of white paper material, such as toilet tissue, paper towels, etc., and in the illustrated embodiment, the testing material is defined by a roll of white toilet tissue. Referring to FIG. 3, in the illustrated embodiment, the toilet tissue comprising the testing material 36 is shown rolled about a tubular cardboard core 96 of the type known to one of ordinary skill in the art. However, it will be understood that inclusion of the cardboard core 96 is not necessary to accomplish the present general inventive concept.

Referring to FIGS. 1-3, in the illustrated embodiment, the upper housing portion 18 of the housing 12 defines a plurality of walls, including a top wall 20, a bottom wall 22, a front wall 24, a rear wall 26, and opposite first and second side walls 28, 30. The walls 20, 22, 24, 26, 29, 30 forming the upper housing portion 18 are joined along respective edges thereof to define a void space 32 therebetween. A spindle 34 extends between the opposite first and second side walls 28, 30, within the void space 32. The spindle 34 is configured to carry the roll of testing material 36 wound about an axial dimension of the spindle 34, and to allow rotation of the testing material 36 about the axial dimension of the spindle 34, such that the testing material 36 may be dispensed from the upper housing portion 18 by unrolling the testing material 36 from about the spindle 34 and feeding it outwardly from the upper housing portion 18. In the illustrated embodiment, the spindle 34 extends loosely through the cardboard core 96 upon which the testing material 36 is rolled, such that the cardboard core 96 and associated testing material 36 are freely rotatable in relation to the spindle 34. In other embodiments, the testing material 36 is fixed in relation to the spindle 34, however, the spindle 34 is freely rotatable in relation to the upper housing portion 18. Additional configurations which allow the testing material 36 to be dispensible from the upper housing portion 18 will be readily apparent to one of ordinary skill in the art.

In several embodiments, the spindle 34 is removably secured between the first and second side walls 28, 30, such that the testing material 36 may be removed from or replaced on the spindle 34. For example, in the illustrated embodiment, the first side wall 28 defines a first through opening 38 extending generally perpendicular to the first side wall 28 at a central location thereof. The second side wall 30 defines a second through opening 40 at a central location thereof extending substantially coaxially to the first through opening 38. In this embodiment, the spindle 34 includes an elongated tubular member 42 having a first end 44 and an opposite second end 46 which are sized and shaped to be received within the first and second through openings, 38, 40, respectively. In several embodiments, including the illustrated embodiment, the spindle 34 further includes fasteners for retaining the tubular member 42 within the first and second through openings 38, 40. For example, in the illustrated embodiment, the spindle first end 44 defines a radially-outwardly extending flange 46 which is sized slightly larger than the first through opening 38 such that the flange 46 is prevented from travelling through the first through opening 38. The spindle second end 46 defines an opening 48 which is adapted to receive a pin 50 therethrough, such that the pin 50 prevents the spindle second end 46 from being withdrawn from the second through opening 40. Thus, in the illustrated embodiment, the pin 50 may be removed from the spindle second end 46 to allow the spindle 34 to be removed from the upper housing portion 18 by withdrawing the spindle 34 from the first and second through openings 38, 40. Thereafter, the above-mentioned roll of testing material 36 may be placed within the void space 32, and the spindle 34 may be threaded through the first through opening 38, through the roll of testing material 36, and through the second through opening 40. Thereafter, the pin 50 may be replaced in the spindle second end 46 to secure the spindle 34 in place between the first and second through openings 38, 40. While the above-described pin 50 and flange 46 serve to removably secure the spindle 34 within the void space 32 between the first and second side walls 28, 30, it will be recognized by one of skill in the art that numerous other devices and configurations exist which are suitable for fastening the spindle 34 within the void space 32 between the first and second side walls 28, 30, and such other devices and configurations may be used without departing from the spirit and scope of the present general inventive concept.

As discussed above, the spindle 34 is configured to allow rotation of the roll of testing material 36 about the axial dimension of the spindle 34, such that the testing material 36 may be unrolled from about the spindle 34 and fed outwardly from the upper housing portion 18. Referring to FIG. 3, in the illustrated embodiment, the bottom wall 22 of the upper housing portion defines a first slot 84 through which the testing material 36 may be fed. Thus, testing material 36 may be fed outwardly from the upper housing portion 18 into the central housing portion 52 as will be further discussed below.

With reference to FIGS. 1-3, the central housing portion 52 defines a plurality of walls 56, 58, 60 which are joined along respective corresponding edges thereof and which cooperate to substantially surround a periphery of the testing material 36 fed from the upper housing portion 18. A window 62 is provided in the central housing portion 52 to allow exposure of a testing surface 14 of the dispensed testing material 36, such that a user may apply paint to the exposed testing surface 14 in order to test a paint applicator. In the illustrated embodiment, the central housing portion 52 defines a rear wall 56 and first and second side walls 58, 60, respectively. The window 62 extends along a front perimeter of the central housing portion 52 and is flanked along forward edges 68, 70 of the first and second side walls 58, 60 by two outwardly rotating doors 64, 66. The doors 64, 66 are rotatably joined along forward edges 68, 70 of the first and second side walls 58, 60 and are rotatable between a closed position, in which the doors are arranged substantially coplanar to one another to substantially close access to an interior of the central housing portion 52 through the window 62, and an open position, in which the doors are rotated outwardly to expose the interior of the central housing portion 52 through the window 62. In the illustrated embodiment, the doors 64, 66 are rotatably joined along respective forward edges 68, 70 of the first and second side walls 58, 60 by folded integral connections. However, those skilled in the art will recognize other suitable means to rotatably join the doors 64, 66 to the first and second side walls 58, 60, and such means may be used without departing from the spirit and scope of the present general inventive concept. Furthermore, it will be recognized that inclusion of the doors 64, 66 is not necessary to accomplish the present general inventive concept.

Figure 6:
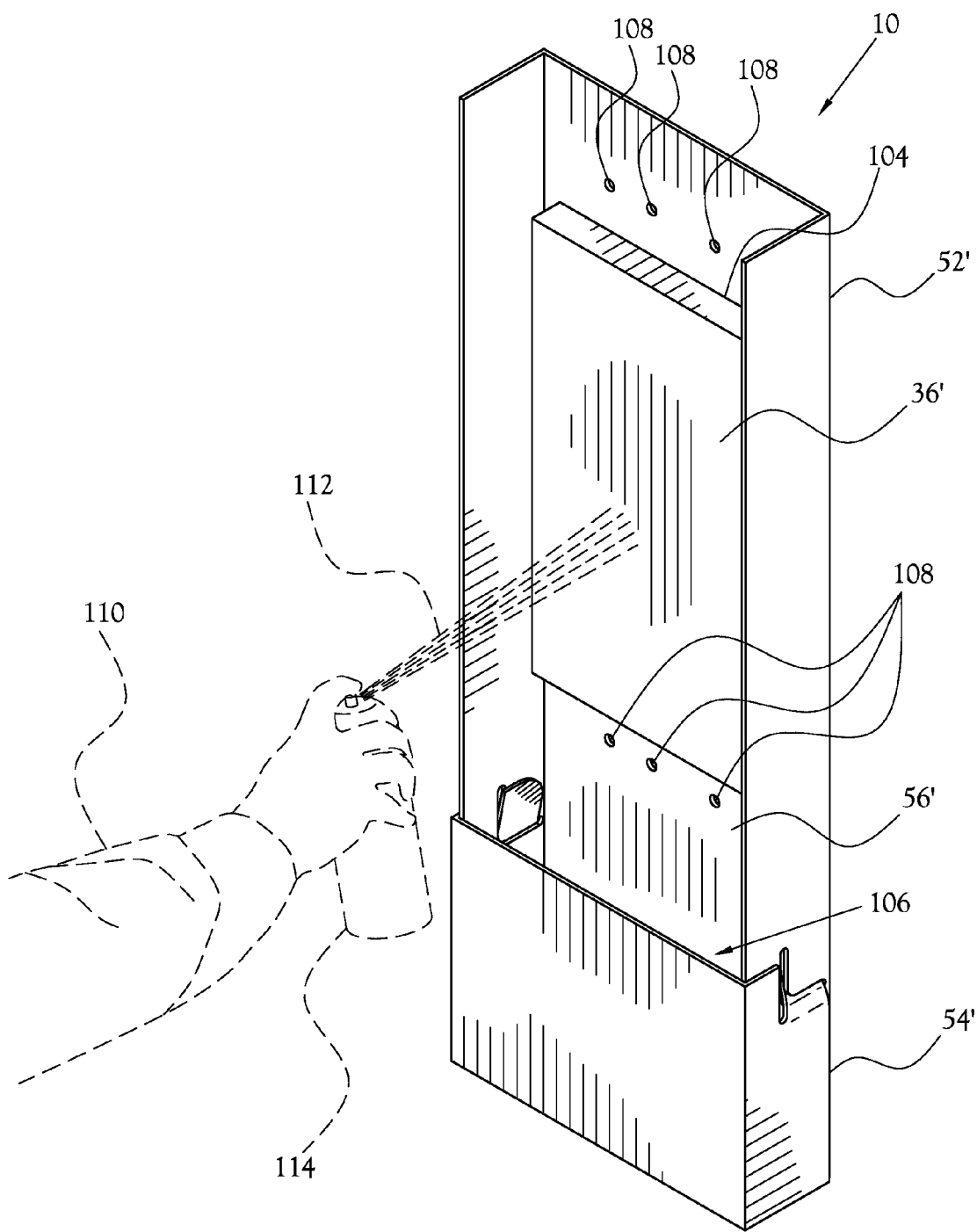
FIG. 6 is a perspective view showing another embodiment of a paint tester station according to several features of the present general inventive concept and illustrating use of the paint tester station.

As noted above, once a measure of testing material 36 is dispensed from the upper housing portion 18 into the central housing portion 52, the window 62 allows access to the dispensed testing material 36 such that a user 110 may apply paint 112 to the testing surface 14 of the dispensed testing material 36 using a selected paint applicator 114 (see FIG. 6). To this extent, it is recognized that, upon application of paint to the testing surface 14 of the dispensed testing material 36, additional paint may be inadvertently distributed to a periphery of the dispensed testing material 36. Thus, it will be recognized that, throughout the application of paint to the testing surface 14, the various walls 56, 58, 60 and doors 66, 68 forming the central housing portion 52 assist in containing any additional paint that is distributed to a periphery of the dispensed testing material 36 and serve to limit distribution of such additional paint beyond the interior of the central housing portion 52. Following application of paint to the dispensed testing material 36, additional testing material 36 may be fed from the upper housing portion 18 into the central housing portion 52, while used testing material 36 may be fed into the lower housing portion 54 for storage and disposal.

Referring to FIGS. 1-3, the lower housing portion 54 forms a disposal container 16 defined by a plurality of walls 72, 74, 76, 78, 80, 82, which are joined along respective edges thereof to define a void space 86 therebetween. In the embodiment of FIGS. 1-3, a second slot 88 is defined along a top wall 72 of the lower housing portion 54. The second slot 88 is sized and configured along the lower housing portion top wall 72 such that used testing material 36 may be received into the lower housing portion 54 through the second slot 88. In several embodiments, including the illustrated embodiment, a collection device is provided to allow collection and bundling of used testing material 36 within the lower housing portion 54. For example, in the illustrated embodiment, a reel 90 is rotatably connected to and extends between opposite side walls 74, 76 of the lower housing portion 54. The reel 90 includes an elongated central shaft 92 which is adapted to be selectively rotated about a central axis thereof in order to wind used testing material 36 about the reel 90, thereby allowing a user to collect and bundle used testing material 36 within the lower housing portion 54 and simultaneously draw additional testing material 36 from the upper housing portion 18 into the central housing portion 52. In the illustrated embodiment, a pair of radially-outwardly extending flanges 93 are disposed along the central shaft 92 of the reel 90 at opposite outer surfaces of the opposite side walls 74, 76 of the lower housing portion 54. The flanges 93 serve to maintain the shaft 92 of the reel 90 in rotatable engagement between the side walls 74, 76 of the lower housing portion 54. Furthermore, at least one handle 94 is disposed at one end of the shaft 92 to assist a user in rotating the shaft 92 in relation to the lower housing portion 54.

Figure 4:
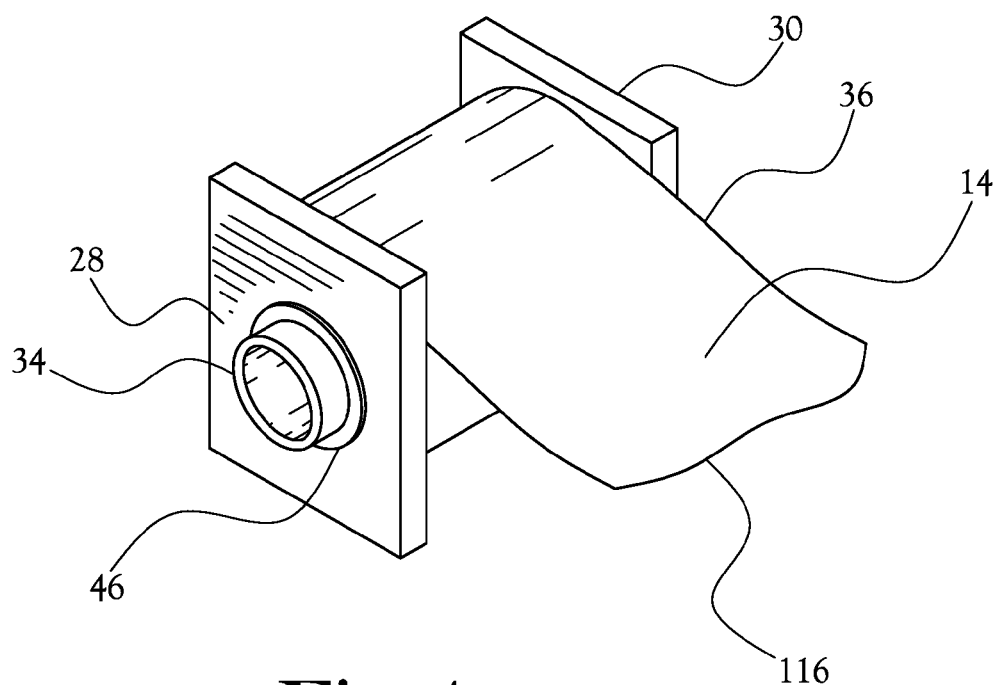
FIG. 4 is a perspective view showing a roll of testing material installed on a spindle according to one embodiment of a paint tester station constructed in accordance with several features of the present general inventive concept.
Figure 5:
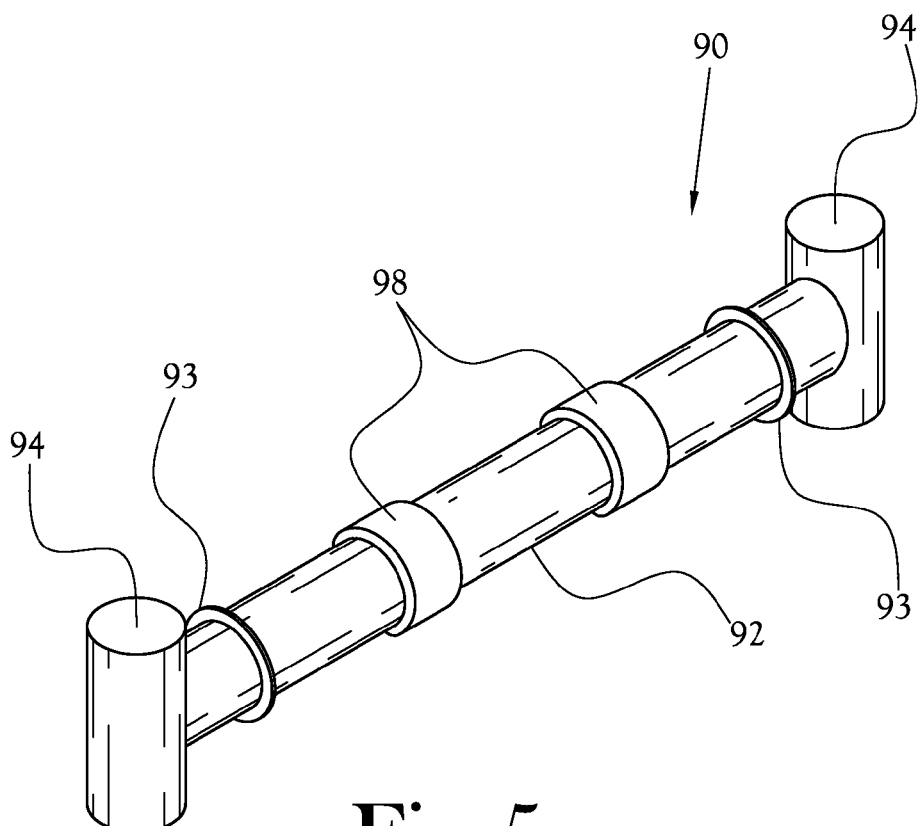
FIG. 5 is a perspective view showing the reel of the paint tester station of FIG. 1.

Referring to FIGS. 3-5, in use of the illustrated embodiment of the paint tester station 10, a leading edge 116 of testing material 36 may be fed from the upper housing portion 18, through the first slot 84, through the central housing portion 52, and through the second slot 88, where it may be fastened to the central shaft 92 of the reel 90 within the lower housing portion 54. In the illustrated embodiment, the shaft 92 of the reel 90 defines a pair of radially-outwardly extending spacers 98 which are sized and shaped to engage an interior surface of a second cardboard core 118, of the type associated with the testing material 36, to establish a frictional connection with the second cardboard core. Upon placement of the second cardboard core in frictional engagement surrounding the spacers 98, the leading edge 116 of the testing material 36 may be fastened to the second cardboard core, as by tape, adhesive, or other suitable fastening means. In this configuration, as discussed above, upon soiling of the testing material 36 exposed in the central housing portion 52, rotation of the reel 90 causes the soiled testing material 36 to be drawn into the lower housing portion and wound about the reel 90, thereby drawing additional testing material from the upper housing portion 18 into the central housing portion 52.

In several embodiments, the first and second slots 84, 88 are offset from one another along a front-to-back dimension of their respective corresponding walls 22, 72. For example, in the embodiment of FIG. 3, the respective rear walls 26, 80 of the upper and lower housing portions 18, 54 are coplanar. In this embodiment, the first slot 84 is disposed along the bottom wall 22 of the upper housing portion 18 at a first depth, such that the first slot 84 is relatively close to the rear wall 26 of the upper housing portion 18. However, the second slot 88 is disposed along the top wall 72 of the lower housing portion 54 at a second depth, such that the second slot 88 is not as close to the rear wall 80 of the lower housing portion 54. This offset of the first and second slots 84, 88 serves to establish at least some degree of tautness of the portion of the testing material 36 contained within the central housing portion 52, such that the testing material 36 contained within the central housing portion 52 is maintained in a relatively coplanar orientation. However, those of skill in the art will recognize other suitable configurations for establishing tautness in the testing material 36, and such configurations may be used without departing from the spirit and scope of the present general inventive concept.

Several additional features of the present general inventive concept are illustrated in FIGS. 1 and 2. For example in the embodiment of FIGS. 1 and 2, a source of paint testing strips 100 of the type known to one of ordinary skill in the art is provided proximate the central housing portion 52. In the illustrated embodiment, the source of paint testing strips 100 includes a pocket 102 disposed along an exterior of the central housing portion 52 which carries a plurality of paint testing strips 100. However, other devices and configurations for accomplishing the source of paint testing strips will be recognized by one of ordinary skill in the art and may be used without departing from the spirit and scope of the present general inventive concept. A plurality of slots 103 are defined along the first and second side walls 58, 60 of the central housing portion 52 and are sized and oriented to allow a user to extend one end of a paint testing strip 100 into the central housing portion 52 through one of the slots 103 such that the paint testing strip 100 is at least partially exposed within the central housing portion 52. Thus, in this embodiment, upon insertion of a paint testing strip 100 into one of the slots 103, a user may apply paint to the exposed testing surface 14 as well as to the paint testing strip 100, thereby allowing the user to create a removable paint sample on the paint testing strip 100 while also testing the paint applicator on the testing surface 14. While the illustrated embodiment depicts the source of paint testing strips 100 and the slots 103 described above, it will be understood that inclusion of the source of paint testing strips 100 and the slots 103 is not necessary to accomplish the paint tester station 10 of the present general inventive concept.

Figure 7:
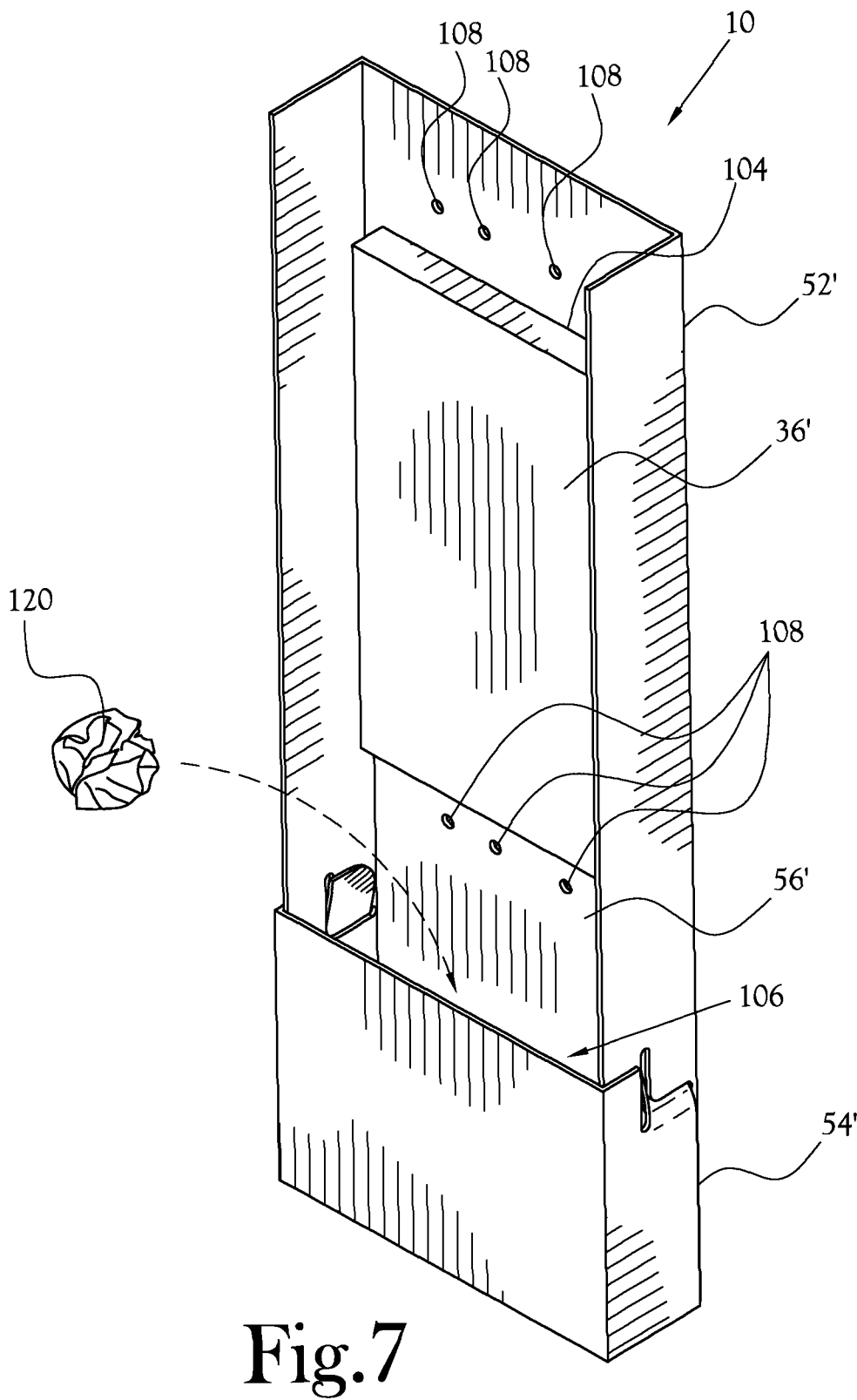
FIG. 7 is a perspective view of the paint tester station of FIG. 6, showing disposal of a used sheet of testing material.

FIGS. 6 and 7 illustrate another embodiment of the paint tester station 10'. In the embodiment of FIGS. 6 and 7, a pad 104 comprising a plurality of sheets of testing material 36' is provided along an interior surface of the rear wall 56' of the central housing portion 52'. Each of the sheets of testing material 36' is releasably bonded along a portion of the perimeter of the sheet, thereby forming the pad 104. Thus, a user may dispose of a used sheet 120 of testing material 36' by tearing away the used sheet of testing material from the pad 104 to expose a new sheet of testing material 36' therebeneath. As shown in FIG. 7, in the illustrated embodiment, the lower housing portion 54' defines an open upper end 106, such that upon tearing away the used sheet 120 of testing material from the pad 104, the used sheet may be discarded into the lower housing portion 54' through the open upper end 106.

In several embodiments, an installation means is provided for securing the paint tester station 10' to a surface. For example, in the embodiment of FIGS. 6 and 7, a plurality of laterally-spaced holes 108 are provided along the top and bottom of the rear wall 56' of the central housing portion 52'. The holes 108 enable a user to secure the paint tester station 10' against an upright surface, such as a wall, column, or other such surface, using conventional fasteners of the type known to one of ordinary skill in the art, such as for example, rope or twine, hooks, loops, screws, nails, etc. In other embodiments, such as the embodiments of FIGS. 1-3, the paint tester station 10 is adapted to be freestanding on a support surface, such as a table or other such support surface. In several embodiments, the paint tester station 10 is configured to be collapsible for easy storage and transportation. For example, in several embodiments, the various walls forming the upper, central, and lower housing portions 18, 52, 54 may be formed from a unitary piece of flat material, such as for example cardboard defining a plurality of perforated folds, plastic, metal, or the like, such that the unitary material may be folded and secured in a three-dimensional configuration to define the housing 12 described above. However, such unitary construction is not necessary to accomplish the paint tester station 10 of the present general inventive concept.

From the foregoing, it will be recognized that a paint tester station 10 which provides a testing surface for testing a paint applicator is described herein. While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A paint tester station for testing a paint applicator, the paint tester station comprising:
    an elongated sheet of flexible testing material having a leading edge and defining a testing surface along a surface thereof;
    a first housing portion configured to carry the testing material and to allow the testing material to be dispensed from a dispensing face of the first housing portion, the first housing portion defining a first slot in the dispensing face sized to receive dispensed testing material therethrough;
    a second housing portion having an interior configured to receive and enclose testing material dispensed from the first housing portion dispensing face, the second housing portion defining a window providing access to dispensed testing material within the second housing portion to allow testing of a paint applicator upon the testing material; and
    a third housing portion defining a reel rotatably secured to and extending between opposite first and second side walls of the third housing portion, the reel being securable to the leading edge of the sheet of paper and selectively rotatable, the third housing portion defining a second slot sized to receive used testing material therethrough, the first slot being offset from a rear wall of the second housing portion by a first distance, the second slot being offset from the rear wall of the second housing portion by a second distance, at least one of the first, second, and third housing portions defining a third slot providing access to the second housing portion interior and configured for receiving a paint testing strip proximate the testing surface of the testing material;
    whereby rotation of the reel with the leading edge secured thereto dispenses the sheet of paper from the first housing portion and draws the sheet of paper through the second housing portion and into the third housing portion.

\* \* \* \* \*